(12) United States Patent
Lefer et al.

(10) Patent No.: US 6,267,812 B1
(45) Date of Patent: Jul. 31, 2001

(54) AQUEOUS DISPERSION OF PIGMENT(S) AND/OR FILLER(S) CONTAINING A PARTICULAR SACCHARIDE COMPOSITION

(75) Inventors: Pierre Lefer, Merville; Serge Gosset, Lestrem; Renaud Baudelle, Merville; Régis Merle du Bourg, Madeleine, all of (FR)

(73) Assignee: Roquette Freres Lestrem (FR)

( * ) Notice: Subject to any disclaimer, the term of this patent is extended or adjusted under 35 U.S.C. 154(b) by 0 days.

(21) Appl. No.: 09/292,251

(22) Filed: Apr. 15, 1999

(30) Foreign Application Priority Data

Apr. 17, 1998 (FR) .................................................. 98 04837

(51) Int. Cl.$^7$ ........................... C04B 14/10; C04B 14/38; B01F 3/12
(52) U.S. Cl. .................... 106/487; 106/162.1; 106/501.1; 516/77; 516/79; 516/88
(58) Field of Search ................. 516/77, 79, 88; 106/162.1, 487, 501.1

(56) References Cited

U.S. PATENT DOCUMENTS

| | | | |
|---|---|---|---|
| 2,191,312 | * 2/1940 | Cannon | 516/79 X |
| 2,822,281 | * 2/1958 | Masley | 106/162.1 |
| 3,447,940 | * 6/1969 | Hawleck | 106/162.1 |
| 3,758,322 | 9/1973 | Roberts et al. | . |
| 4,600,439 | 7/1986 | Schneider et al. | . |
| 5,180,522 | * 1/1993 | Kawashima et al. | 516/77 |
| 5,618,342 | 4/1997 | Herget et al. | 106/416 |
| 5,817,780 | 10/1998 | Flèche et al. | 536/18.6 |
| 5,831,043 | 11/1998 | Flèche | 536/18.5 |
| 5,906,804 | * 5/1999 | Aral et al. | 516/88 X |

FOREIGN PATENT DOCUMENTS

0 571 190 A2   11/1993  (EP) .

OTHER PUBLICATIONS

English abstract (WPIL) of EP–542052 A1 (Jun. 1999).
Ullmann's Encyclopedia of Industrial Chemistry, vol. A7 p 109 à 136 (1986).
Ullmann's Encyclopedia of Industrial Chemistry, vol. A18, p 365, 437, 446, 455–465, 611 to 614, 647–658 (1991).
Ullmann's Encyclopedia of Industrial Chemistry, vol. A20, p 495–500, 245, 250–257, 266–271, 279, 282, 371, 377 (1992).
Ullmann's Encyclopedia of Industrial Chemistry, vol. A22, p 154–156 (1993).
Ullmann's Encyclopedia of Industrial Chemistry, vol. A23, p 391–399 (1993).
"Pigments for paper", 1997—TAPPI Press, p 1–20 (1997).
"Peintures en phases aqueuses (paints in an aqueous phase)"—Chapter 9, 1997, Galvano Organo pp 1–7 & 81–93.
"Microbiological control of pigments and fillers in paper industry", Menter et al in "the fundamentals of papermaking material" vol2, p 955–993 (Sep. 1997).
English abstract (WPIL) of EP 780 399 A2 Jun. 1999.

* cited by examiner

*Primary Examiner*—Richard D. Lovering
(74) *Attorney, Agent, or Firm*—Henderson & Sturm LLP

(57) ABSTRACT

The present invention relates to an aqueous dispersion of pigment(s) and/or filler(s) containing, as an additive, a saccharide composition containing at least 30% of hydrogentated monosaccharide(s) and/or disaccharide(s). The saccharide composition contains at least 75% of such saccharides, in particular sorbitol, mannitol and/or maltitol. The optimum introduction rate is somewhere between 1 and 3%, in dry weight in relation to the dry weight of pigment(s) and filler(s) of the dispersion. The dispersion according to the invention presents a Brookfield viscosity (20° C., 20 rpm) of between 100 and 4000 mPa.s and a viscosity instability index lower than 35%. The dispersion according to the invention can present a very high level of solid matter, for example from 72 to 80% and be used advantageously in numerous industries such as those connected with paper, paint and varnishes, inks, adhesives, detergents, textile materials and leathers, etc. The dispersion can contain various pigments or fillers such as clays (kaolins, smectites), calcium carbonates, talc, titanium dioxide, calcium or barium sulphates or sulfoaluminates.

20 Claims, No Drawings

AQUEOUS DISPERSION OF PIGMENT(S) AND/OR FILLER(S) CONTAINING A PARTICULAR SACCHARIDE COMPOSITION

FIELD OF THE INVENTION

The present invention relates to a new aqueous dispersion of pigment(s) and/or filler(s) which contains, as an additive, a particular saccharide composition with a base of hydrogenated monosaccharide(s) and/or disaccharide(s). It applies likewise to a particular method of preparation as well as to certain uses of said dispersion.

BACKGROUND OF THE INVENTION

By "pigments", natural or synthetic, organic or mineral substances are generally meant, presenting themselves in the form of small particles which are practically insoluble in their application medium and which are used for their colouring, protective and/or magnetic properties. For their part, the "fillers" are generally used, in the first place, as filling materials which make it possible, at a lower cost, to preserve the essential applicable properties of their application medium, indeed to improve certain of these properties.

These notions do not in any way exclude one another since numerous substances qualify at the same time as "pigments" and "fillers", depending on the fields and conditions of application envisaged. This is the case for example with clays (kaolins, smectites and others), calcium carbonates (precipitated or natural), talc, titanium dioxide, calcium or barium sulphates or sulfoaluminates Numerous fields of application widely use pigments and fillers, and in particular the industries manufacturing paper, paints and varnishes, inks, adhesives, detergents, textile materials and leathers, plastics materials and rubbers, films, ceramics and enamels, construction materials and cosmetic materials.

In certain industries, certain pigments or fillers are likewise called "extenders" "extender pigments", "pigment fillers" or "pigment coatings", these labels being included here in the all-embracing notion of "pigments and/or fillers".

The pigments and the fillers present very great diversity as much in terms of origin and nature as in physico-chemical and application properties as emerges, amongst other things, from the work entitled "ULLMANN'S ENCYCLOPEDIA OF INDUSTRIAL CHEMISTRY" —Fifth Edition —VCH, in particular the following passages of said work:
Volume A7 (1986): "Clays", pages 109–136,
Volume A18 (1991): "Paints and Coatings", in particular pages 365, 437, 446 and 455–465,
Volume A18 (1991): "Paper and Pulp", in particular pages 611–614 and 647–658,
Volume A20 (1992): "Plastics, Additives", in particular pages 495–500,
Volume A20 (1992): "Pigments, Inorganic", pages 245, 250–257 and 266–271, and "Pigments, Organic", pages 371–377,
Volume A22 (1993): "Printing Inks", in particular pages 154–156, and
Volume A23 (1993): "Rubber, 4. Chemicals and Additives", in particular pages 391–399.

As far as more specifically applications to do with paper are concerned, one can refer to the work "Pigments for Paper",1997, TAPPI PRESS, pages 1–20. For the applications in paints, reference can be made to the work "Peintures en phase aqueuse (Paints in an aqueous phase)" Chapter 9 "Pigments et matieres de charge (Pigments and Filling Materials)",1997, GALVANO ORGANO.

In a certain number of uses it is, if not obligatory, at least advantageous to be able to have available pigments and/or fillers in the form of aqueous dispersions, commonly called "slurries", presenting variable amounts of solid matter ("S.M."), generally greater than 20–25%, for example in the order of 35–70% for those intended for paper coating.

The respective advantages and drawbacks of the slurries and of the dry forms of pigments are summarised on page 72 of the above-quoted work "Pigments for paper". Compared with dry forms, the aqueous dispersions generally make it possible to improve the industrial operations of metering, conveying and mixing. They likewise permit considerable time saving to the users, especially when they come in the form of ready-to-use products.

These slurries likewise constitute one of the means making it possible to add all or part of the water which is necessary for the desired constitution, reactivity and evolution of the application medium in which pigment(s) and/or filler(s) are introduced (for example a coating mix for paper), even if later said water is eliminated more or less completely at the stage of the final product (for example dried coated paper).

The preparation, storage, handling and use of dispersions of pigments or fillers pose however technical and economic problems. First of all, obtaining and keeping homogenous and stable dispersions necessitate using mechanical means (industrial agitators) and chemical means (dispersing agents, biocides) which increase the cost price of these compositions. Now, industrially, these means are obligatory even if there is a risk of altering significantly the properties, especially optical properties, of the finished product (paper, paint, etc.).

The dispersing agents commonly used are of polyanionic nature such as the salts of polyphosphoric or polyacrylic acids. However the polyphosphates are liable to precipitate and thus to become ineffective in a few days, particularly when the dispersion is stored at a relatively high temperature or at a very alkaline pH. Moreover, the optimum rate of introduction of a dispersing agent into a slurry is difficult to determine in a rapid and reliable manner. In particular, the excessive dose of a dispersing agent can result in the undesirable increase in viscosity of a slurry. Furthermore, in certain applications, the dispersing agent contained in a slurry of acceptable viscosity can increase unfavourably the viscosity of the final application medium, for example a coating composition for paper based on anionic binding agents.

The dispersibility and the ability to be ground of a pigment such as titanium dioxide can be improved or controlled by surfacing with numerous mineral or organic, hydrophilic or hydrophobic compounds, as described in the works already quoted, "Pigments for Paper" (pages 163–165) and "ULMANN'S ENCYCLOPEDIA CHEMISTRY" (pages 279, 282 —Volume A20). Among these compounds are cited the polymers of alcohols, the amines and the organic acids which are known moreover as agents for milling cement. Patent FR 2.146.484 discloses likewise the possibility of dispersing directly filtered/dehydrated titanium dioxide with agents such as polyols (2-amino-2 ethyl 1-propanol, sorbitol, mannitol), triethanolamine or polycarboxylates, with a view to its use in paints. However, from reading this patent it emerges that, a) to be effective, these agents have to be introduced in very precise proportions, i.e. between 0.3 and 0.75% by weight of dry pigment, and b) these agents do not in any way stop the dispersions of titanium dioxide obtained from evolving unfavourably during storage, the viscosity of said dispersions increasing from 29% to 227% in a week, as emerges from the data of table I of this patent.

Another drawback of the aqueous dispersions of pigment (s) and/or filler(s) resides in the additional cost of energy linked to the transport then to the elimination of the water which they contain. It is thus generally sought to be able to increase the solid matter (SM). Furthermore, slurries with high SM are desired to increase the productivity of certain industrial installations such as paper coating machines.

However, increasing the concentration of a slurry is often limited indeed impossible because of the occurrence of induced phenomena of increasing the viscosity and/or the aptitude for dilatancy, these phenomena being able to have a very unfavourable effect on the rheological characteristics, in particular the pumpability, of the slurry.

Moreover, many pigments show a marked propensity to dry on the walls of the storage vats of the slurries and to form there undesirable deposits, notably ones favourable to the proliferation of microbes. Such a proliferation can very seriously limit the possibilities of use of the pigments but likewise of the final products containing them, as described in the article entitled "Microbiological Control of Pigments and Fillers in Paper Industry" published in "The Fundamentals of Papermaking Material", Volume 2, pp 955–993, C. F. BAKER.

It emerges from the above that there was a need to have available aqueous dispersions of pigment(s) and/or filler(s) which present simultaneously:

good rheological stability in storage, good microbiological stability in storage, low tendency to form deposits in the preparation/storage enclosures and in transport, particularly after storage, low aptitude for dilatancy and good pumpability, especially after storage, and all whilst being capable of presenting if necessary high amounts of SM, including ones greater than those used in current industrial practice.

And the applicants have found, after extensive research, that such a result could be obtained as soon as the dispersions in question confirmed a certain number of characteristics in their composition and rheology, said characteristics being connected to the use, as an additive, of particular saccharide compositions.

OBJECTS AND SUMMARY OF THE INVENTION

In a more precise manner, the subject matter of the present invention is an aqueous dispersion of pigment(s) and/or filler(s) characterised in that it a) comprises a saccharide composition containing at least 30% by weight of a saccharide selected from the group consisting of the hydrogenated monosaccharides, hydrogenated disaccharides, and any mixtures of at least any two of these products, this percentage being expressed in dry weight by comparison with the dry weight of all the hydrogenated saccharides (mono-, di-, tri-, oligo- and polysaccharides) contained in said composition, b) presents a Brookfield viscosity measured at 20° C. and at 20 rpm of between 100 and 4,000 mPa.s, preferably between 200 and 3,000 mPa.s and c) a viscosity instability index, measured according to a test A, lower than 35%, preferably lower than 32%.

This test A makes it possible to evaluate the rheological stability during storage of the dispersion. It consists in measuring, at a given moment, and particularly from after its preparation, the Brookfield viscosity of a dispersion and this at 20° C. and at 20 rpm, then in re-measuring it in the same conditions, seven days later, after it has been stored in hermetically sealed 300ml glass jars, kept at 20–22° C. approximately and the contents of which are agitated manually just before any measuring of the viscosity.

The stability index, expressed in %, is given by the formula (BVf - BVi) / BVi, where BVi =initial viscosity of the dispersion and BVf =viscosity of the same dispersion, measured seven days after BVi is measured.

According to a first variant, the saccharide composition contained in the dispersion of pigment(s) and/or filler(s) according to the invention comprises at least 60%, preferably at least 70% and more especially at least 75%, by weight of a hydrogenated saccharide selected from the group consisting of sorbitol, mannitol, xylitol, arabitol, iditol, erythritol, maltitol, lactitol, glycosido-1-6 mannitol, isomaltitol, cellobiitol and any mixtures of at least any two of these products, these percentages being expressed as detailed above.

In patent EP 106.763 in the name of the assignee, the use of such hydrogenated saccharides has already been described to make fluid at a certain level, (approximately 4.2–8.8 Pa.s) coating mixes with very high initial viscosity (13.5 Pa.s, for example), whose binding system combines non-depolymerised starch and latex. However, this document is not concerned at all with slurries of pigment(s) as such, a fortiori with the possible effects that this or that hydrogenated saccharide could provide at the level of the characteristics of stability in storage of these slurries, notably in terms of rheology, of microbial contamination or of deposits formation on the walls of the storage enclosures. This all the more so because this patent demonstrates the interest in introducing all hydrogenated sugar at the level of the final stage of preparation of a coating mix, i.e. in an extremely viscosified medium where the pigments have already been brought together with starch and latex, a medium which is used quasi-extemporaneously for the treatment of paper.

More recently, patent U.S. Pat. No. 5,618,342 advocated the use of polyols such as glycerol, sorbitol, polyethylene/polypropylene glycols, and polyvinyl pyrrolidine, as humectants for preparations with very high SM (approximately 90% depending on the examples) based on very particular pigments, i.e. flaky silicates surfaced with metallic oxides. This patent, which only gives glycerol as an example of a humectant, underlines however the necessity of using a preservative (potassium sorbate, esters of PHB) in order for these preparations of pigments to be truly redispersible and thus able to be used industrially.

Now, in a surprising and unexpected manner, the applicants have not only found that, in the purpose sought by the present invention, hydrogenated mono or disaccharides were more effective than glycerol but equally that the substitution, to a significant degree, of a hydrogenated monosaccharide by a hydrogenated disaccharide only altered very little, indeed improved (by decreasing it) the viscosity instability index of the slurry with this additive. Now, it was logical to think that the increase in molecular weight of an additive would increase as much the intrinsic viscosity as the instability during storage of a slurry.

As a result of which, according to a variant of the dispersion according to the invention, the latter comprises a saccharide composition which contains:

from 0.5 to 100%, preferably from 5 to 100% and more especially from 10 to 90%, by weight of maltitol, and from 0 to 99.5%, preferably from 0 to 95% and more especially from 10 to 90% by weight of sorbitol and/or mannitol.

In a general manner, the saccharide composition can be used in liquid, paste or solid form with a view to the preparation of the dispersion according to the invention. It can in particular be used in the form of syrups with any SM, for example from 20 to 80% of SM. Depending on the water which it contains, the saccharide composition can, or not, provide directly all the water necessary for the preparation of the dispersion.

This preparation can then be made by mixing the saccharide composition and pigments and/or fillers, in the presence, or not, of "exogenous" water, i.e. water not provided by said composition. By preference, this preparation is done in the presence, amongst other things, of anionic dispersing agents such as those quoted above or, for example, non-hydrogenated or hydrogenated saccharides such as the hydrolysate of starch POLYSORB$^R$ 70/12/12 and oxidised, for example according to one of the methods described in patents EP 780.399, EP 798.310 or WO 97/20860.

The new use of oxidised saccharides, hydrogenated or non-hydrogenated, as dispersing agents for compositions of pigments and/or fillers moreover forms part of the present invention.

The pigments and fillers which may be used according to the invention include the products quoted above and those described in at least one of the documents of prior art referred to above.

According to a variant of the aqueous dispersion of pigment(s) and/or filler(s) according to the invention, the latter contains from 0.2 to 5%, preferably from 0.5 to 4% and more especially from 1 to 3% saccharide composition such as described, these percentages being expressed in dry weight of saccharide composition by comparison with the dry weight of pigment(s) and filler(s) contained in said dispersion.

Introduction rates of 1.3 to 2.5% approximately are particularly advantageous.

The SM of slurries is not a restrictive parameter of the invention. In a general manner, this SM is greater than 50% and lower than 90%.

The applicants have found that particularly advantageous aqueous dispersions of pigment(s) and/or filler(s) present a) an SM of between 55 and 88%, preferably between 65 and 85% and b) a viscosity instability index, measured as described above, lower than 30%.

However, for certain applications such as the applications of mass paper making, the SM of slurries can be lower than 35% and for example between 20 and 30% approximately.

Furthermore the pH of slurries can be located within a large range of pH, for example between 5.0 and 11.0 approximately and especially between 6.5 and 10.5 approximately.

With a view to their application, in particular in paper coating, these dispersions can especially present, a) an SM of between 72 and 80%, b) a Brookfield viscosity (20° C. 20 rpm) of between 200 and 1,500 mPa.s and c) a pH of between 6.5 and 10.5 approximately, in particular between 8.0 and 10.0 approximately.

As exemplified moreover, these dispersions can furthermore be characterised by the fact that they contain also a non-saccharidic polyol, in particular glycerol, which has been supplied at the same time or not as the saccharide composition.

Moreover and as likewise exemplified below, the applicants have found that it could be particularly of interest to prepare the aqueous dispersion according to the invention by introducing the pigments at a final stage or at the very least to a medium containing already the saccharide composition based on hydrogenated saccharides.

In a surprising manner, this method of operation makes it possible to increase further the efficacy of said composition.

The subject matter of the present invention is thus likewise a method of preparation of an aqueous dispersion of pigment(s) and/or filler(s) characterised in that it comprises a stage in the course of which all or part of the quantity of pigment(s) and/or filler(s) is introduced within a medium constituted, totally or in part, by a saccharide composition such as described above.

The dispersions according to the invention constitute new products which, because of their rheological and stability characteristics can be used to advantage in the industries manufacturing paper, paints and varnishes, inks, adhesives, textile materials and other industries quoted before.

The general concept of the present invention rests also on the use of a saccharide composition such as described to improve stability during storage, in particular rheological stability, and/or the self-cleaning character of an aqueous dispersion of pigment(s) and/or filler(s).

MORE DETAILED DESCRIPTION

The present invention will now be described in even more detail with the aid of the following examples which are not restrictive in any way.

EXAMPLE 1

Dispersions of kaolin of the type "KAOFINE 90" are prepared in a stainless steel enclosure with a capacity of 2 litres, equipped with a motor fitted with a deflocculating turbine which is 65 mm in diameter and turns at 1,400 rpm. Each dispersion is made by placing successively in the water the following products:

0.1% of dispersing agent "POLYSEL S" (in dry weight/dry weight of pigment),

Soda at 100g/l in a sufficient quantity for the final medium to have a pH of approximately 8.5–9.0, 1.5% in dry weight/dry weight of pigment, of one or other of the saccharide compositions A–D and F–G described below, and "KAOFINE 90" in a sufficient quantity for the solid matter (SM) of the dispersions to be 72%.

The saccharide compositions A–D used according to the invention, and F and G not according to the invention, consist respectively of:

A=mix* containing approximately 98.5% (dry/dry) sorbitol, 0.6% (dry/dry) mannitol and 0.2% (dry/dry) maltitol, B=mix* containing approximately 71.5% sorbitol, 1% mannitol and 13% maltitol, C=mix* containing approximately 2% sorbitol, 0.5% mannitol and 74% maltitol, D=maltitol powder, F=mix* containing approximately 10% sorbitol, 10.5% mannitol and 5% maltitol, G=mix* containing approximately 1% sorbitol and 6% maltitol.

*The solid matter (SM) of these mixes is constituted furthermore by hydrogenated tri-, oligo- ed/or polysaccharides. The SM of these mixes is somewhere between 70 and 80%.

The compositions obtained are dispersed for 30 minutes with the aid of the deflocculating turbine quoted above.

At the time Ti, i.e. from after passing through the turbine, the Brookfield viscosity is measured (VBi in mPa.s), at 20° C. and 20 rpm, of each dispersion as well as of a control dispersion T not containing any saccharide composition. With the aid of a high-shearing viscosimeter of the type "HERCULES DV-10" equipped with a spindle A, the dilatancy threshold SDi is checked, i.e. the maximum speed (200, 300, 400 or 500 rpm) for which the dispersion does not present any dilatancy phenomenon. The HERCULES viscosity (VHi in mPa.s) of the dispersion is measured at this speed. At the time Tf, i.e. seven days after Ti, the Brookfield viscosity (VBf), the dilatancy threshold (SDf) and the HERCULES viscosity at the dilatancy threshold (VHf) of each of the dispersions are re-measured. Starting from the values VBi and VBf, the viscosity instability index (INST in %), is calculated as indicated previously.

The results obtained are summarised below:

| DISPERSION | T | A | B | C | D | F | G |
|---|---|---|---|---|---|---|---|
| VBi (mpa · s) | 1500 | 1250 | 1250 | 1300 | 1300 | 1250 | 1650 |
| SDi (rpm) | 500 | 500 | 500 | 400 | 400 | 400 | 400 |
| VHi (mpa · s) | 46.2 | 41.6 | 42.4 | 43.9 | 45.3 | 44.7 | 56.3 |
| VBf (mPa · s) | 1950 | 1600 | 1450 | 1700 | 1700 | 1700 | 2250 |
| SDf (rpm) | 200 | 300 | 300 | 300 | 300 | 200 | 200 |
| VHf (mpa · s) | 74.9 | 67.5 | 57.3 | 78.3 | 78.9 | 84 | 108 |
| INST (%) | 30 | 28 | 24 | 30 | 30 | 36 | 36 |

It emerges from these results that the dispersions containing the saccharide compositions A–D present at the same time improved viscosity stability and a lower aptitude for dilatancy after storage, with respect to the control dispersion T. On the other hand, the dispersions containing compositions F and G, not according to the invention, present a viscosity stability lower than that of dispersion T and an aptitude for dilatancy after storage, which is at least as developed. These results show the interest, which could not be suspected, in using saccharide compositions containing at least 30% hydrogenated mono- and/or disaccharides to improve the stability in storage of aqueous dispersions of pigments.

In a surprising manner, the significant presence of a disaccharide (maltitol) in these compositions not only does not worsen significantly this stability in storage with respect to a composition constituted essentially of monosaccharide (sorbitol —cf. composition A) but furthermore is capable of improving further this stability (cf. composition B).

Other studies have likewise shown that, after four days' storage at 20 or 25° C. for example, the pigment dispersions according to the invention:
- did not present any more pronounced ability than the control dispersion T to be contaminable by microorganisms (in particular mesophilic aerobic germs, anaerobic germs, yeasts and moulds),
- presented a drop in pH not greater than that of the control and less yellowing,
- did not present any particular propensity to phase decantation or separation,
- left, by comparison with the control dispersion, far fewer deposits on the walls of the storage enclosures. Emptying, cleaning and rinsing these enclosures are thus further facilitated by the remarkable self-cleaning properties of the dispersions according to the invention.

These elements constitute undeniable industrial advantages and all the less foreseeable as the dispersions according to the invention contain, in characteristic manner, substances (saccharides) which, by their nature, can only a priori facilitate the formation of furring deposits favourable to microbial contamination and liable to hamper cleaning operations.

EXAMPLE 2

Within the framework of other tests, the following mixes have been tested as additives for aqueous dispersions of "KAOFINE 90" with 72% SM.
- mix 1: mix with 97% SM with a base of 30% glycerol +70% of a saccharide composition containing especially 87% sorbitol, 8% mannitol and 3% maltitol,
- mix 2: mix with 92% SM with a base of 25% glycerol and 75% of a saccharide composition containing especially 3% sorbitol and 54% maltitol.

Mix 2 proved to be as effective as an additive constituted completely of glycerol. Mix 1 proved to give an aptitude for dilatancy lower than that of glycerol and equivalent to that of an additive constituted by the above-quoted composition B.

EXAMPLE 3

The effect of the incorporation of 0.3–1.5% of the saccharide composition B described above in each of the pigment dispersions below was studied:
- dispersion 1: dispersion with 68% SM of delaminated kaolin of the type "KAOWHITE S",
- dispersion 2: dispersion with 68% SM of clay of the type "SPS English China Clay",
- dispersion 3: dispersion with 72% SM of kaolin "KAOFINE 90",
- dispersion 4: dispersion with 75% SM of calcium carbonate "HYDROCARB HC 90",
- dispersion 5: dispersion with 75.2% SM of a mix 60/40 calcium carbonate ("HYDROCARB HC 90") and kaolin ("AMAZON 88")

For these tests, the saccharide composition was placed in the water after the dispersing agent ("POLYSEL S") and the pigments, the resulting mixture being redispersed for 5 minutes.

These tests have shown overall the interest of the saccharide composition B for reducing and stabilising the viscosity of slurries of pigments with very different characteristics as much in terms of SM, of viscosity as of nature of pigment. It has particularly appeared that such a composition was particularly of interest for obtaining, as desired for numerous industrial applications, dispersions presenting simultaneously good viscosity stability and a high SM, located in particular between 72 and 80%. In this perspective, rates of introduction of composition B greater than or equal to 1.3% have been shown to be particularly advantageous.

In another test, dispersions such as dispersions 1–3 quoted above have been realised, but by introducing the whole of the saccharide composition B before putting the pigments to work, the resulting mix being dispersed for 30 minutes. Curiously, this manner of operation made it possible to reduce further the viscosity of the slurries which makes it possible to imagine increasing further, if necessary, the SM of such dispersions.

EXAMPLE 4

In this test, the effects have been studied of different saccharide compositions as agents of viscosity stabilisation and/or dispersing agents for a calcium carbonate slurry not containing initially any additive, presenting an SM of 26%, a Brookfield viscosity after preparation of 600 mPa.s and a viscosity after being stored for 24 hours, of 900 mPa.s or an increase in viscosity of 50%.

It appears that using 1% of the saccharide composition B quoted above makes it possible, with an approximately equal initial velocity (550 mPa.s), to increase not only the SM (29.5%), but also the stability in storage (increase of viscosity after 24 h: 18.2% only) of. the dispersion. The same is true of a saccharide composition with 70% SM of borate sorbitol, which with equal velocity (600 mPa.s) makes it possible to increase even more significantly the SM (39%), and the stability in storage (increase in viscosity: 8.3% only) of the dispersion.

Furthermore, and in a surprising manner, the saccharide composition F quoted above, when it is subjected to an oxidation treatment such as that described in patent WO 97/20860 makes it possible to further increase the SM (46.8%) and the stability in storage (no increase in viscosity after 24 hours) of the dispersion. As a result of which, such an oxidised saccharide acts like a real dispersing agent, able to be substituted, totally or partially, for a classic dispersing agent such as a polyacrylate.

What is claimed is:

1. An aqueous dispersion of pigment(s) and/or filler(s)
    a) comprising a saccharide composition containing at least 30% by weight of a saccharide selected from the group consisting of hydrogenated monosaccharides, hydrogenated disaccharides and any mixtures of at least any two of these products, this percentage being expressed in dry weight by comparison with the dry weight of the total amount of the saccharides contained in said composition,
    b) presenting a Brookfield viscosity, measured at 20° C. and at 20 rpm, of between 100 and 4,000 mPa.s, and
    c) presenting a viscosity instability index, measured according to a test A, lower than 35%.

2. A dispersion according to claim 1, presenting a Brookfield viscosity of between 200 and 3,000 mPa.s.

3. A dispersion according to claim 1, presenting a viscosity instability index lower than 32%.

4. A dispersion according to claim 1, wherein the saccharide composition contains at least 60% by weight of a saccharide selected from the group consisting of sorbitol, mannitol, xylitol, arabitol, iditol, erythritol, maltitol, lactitol, glycosido-1-6 mannitol, isomaltitol, cellobiitol and any mixtures of at least any two of these products.

5. A dispersion according to claim 4, wherein the saccharide composition contains at least 70% by weight of the saccharide.

6. A dispersion according to claim 4, wherein the saccharide composition contains at least 75% by weight of the saccharide.

7. A dispersion according to claim 4, wherein the saccharide composition contains:
    from 0.5 to 100% by weight of maltitol, and
    from 0 to 99.5% by weight of sorbitol and/or mannitol.

8. A dispersion according to claim 7, wherein the saccharide composition contains:
    from 5 to 100% by weight of maltitol, and
    from 0 to 95% by weight of sorbitol and/or mannitol.

9. A dispersion according to claim 7, wherein the saccharide composition contains:
    from 10 to 90% by weight of maltitol, and
    from 10 to 90% by weight of sorbitol and/or mannitol.

10. A dispersion according to claim 1, containing from 0.2 to 5% of the saccharide composition, these percentages being expressed in dry weight of the saccharide composition in comparison with the dry weight of pigment(s) and filler(s) contained in the dispersion.

11. A dispersion according to claim 10, containing from 0.5% to 4% of the saccharide composition.

12. A dispersion according to claim 10, containing from 1% to 3% of the saccharide composition.

13. A dispersion according to claim 1, presenting:
    a) a solid matter (SM) of between 55 and 88%, and
    b) a viscosity instability index lower than 30%.

14. A dispersion according to claim 13, presenting a solid matter of between 65 and 85%.

15. A dispersion according to claim 13, presenting:
    a) an SM of between 72 and 80%,
    b) a Brookfield viscosity, measured at 20° C. and at 20 rpm, of between 200 and 1,500 mPa.s and
    c) a pH of between 6.5 and 10.5.

16. A dispersion according to claim 15, presenting a pH of between 8.0 and 10.0.

17. A dispersion according to claim 1, containing also a non-saccharidic polyol, which has been provided at the same time or not as the saccharide composition.

18. A dispersion according to claim 17, in which the polyol is glycerol.

19. A method of preparing an aqueous dispersion of pigment(s) and/or filler(s), comprising a stage in course of which all or part of the quantity of pigment(s) and/or filler(s) is introduced within a medium constituted, in total or in part, by a saccharide composition containing at least 30% by weight of a saccharide selected from the group consisting of hydrogenated monosaccharides, hydrogenated disaccharides and any mixture of at least any two of these products, this percentage being expressed in dry weight in relation to the total amount of hydrogenated saccharides contained in said composition, said dispersion presenting a Brookfield viscosity, measured at 20° C. and at 20 rpm, of between 100 and 4,000 mPa.s, and presenting a viscosity instability index, measured according to a test A, lower than 35%.

20. A dispersion of pigment(s) and/or filler(s) obtained according to claim 19 for use in the industries manufacturing paper, paints and varnishes, inks, adhesives, detergents, textile materials and leathers, plastics materials and rubbers, films, ceramics and enamels, construction materials and cosmetic materials.

* * * * *